(12) United States Patent
Yamada

(10) Patent No.: US 6,301,041 B1
(45) Date of Patent: Oct. 9, 2001

(54) UNIDIRECTIONAL OPTICAL AMPLIFIER

(75) Inventor: Minoru Yamada, Kanazawa (JP)

(73) Assignee: Kanazawa University, Ishikawa Pref. (JP)

(*) Notice: Subject to any disclaimer, the term of this patent is extended or adjusted under 35 U.S.C. 154(b) by 0 days.

(21) Appl. No.: 09/376,180

(22) Filed: Aug. 17, 1999

(30) Foreign Application Priority Data

Aug. 18, 1998 (JP) .................................................. 10-231251

(51) Int. Cl.⁷ .................................. H01S 3/09; H01J 7/24

(52) U.S. Cl. .............................. 359/333; 359/335; 372/2; 372/74

(58) Field of Search ..................................... 359/330, 332, 359/333, 335; 372/2, 74

(56) References Cited

U.S. PATENT DOCUMENTS

| | | | |
|---|---|---|---|
| 3,822,410 | * 7/1974 | Madey ................................... | 331/94 |
| 4,122,372 | 10/1978 | Walsh ...................................... | 315/5 |
| 4,506,229 | * 3/1985 | Prosnitz et al. ........................... | 330/4 |
| 4,511,850 | * 4/1985 | Schlitt et al. ............................ | 330/4 |
| 4,529,942 | * 7/1985 | Patel et al. ............................... | 330/4 |
| 4,727,550 | * 2/1988 | Chang et al. ............................ | 372/2 |
| 4,755,764 | * 7/1988 | Rosenberg et al. .................... | 330/4.3 |
| 5,263,043 | * 11/1993 | Walsh .................................... | 372/102 |
| 5,268,693 | 12/1993 | Walsh .................................... | 372/74 |

FOREIGN PATENT DOCUMENTS

| | | |
|---|---|---|
| 867987 A2 | * 9/1998 | (EP) . |
| 911925 A2 | * 4/1999 | (EP) . |
| 10-270808 | * 10/1998 | (JP) . |

OTHER PUBLICATIONS

M. Yamada, IEEE Journal of Quantum Electronics vol. 35, #2, pp. 147–152, Feb. 1999.*

Kosai et al, IEEE Trans. on Plasma Science, vol. 20, #3, Jun. 1992.*

Minoru Yamada, "Theoretical Proposal for a Unidirectional Optical Amplifier", IEEE Journal of Quantum Electronics, vol. 35, No. 2, pp. 147–152 (1999).

Ammon Yariv et al., "Amplification of Radiation by Relativistic Electrons in Spatially Periodic Optical Waveguides", Optics Communications, vol. 24, No. 2, pp. 233–236 (1978).

* cited by examiner

*Primary Examiner*—Nelson Moskowitz
(74) *Attorney, Agent, or Firm*—Venable; Robert J. Frank; Jeffrey W. Gluck

(57) ABSTRACT

Within a vacuum vessel, there are arranged an electron emitting part emitting an electron beam in a first direction, and an optical amplifying part amplifying incident light with the help of energy of the electron beam. The optical amplifying part includes a flat dielectric substrate made of a quartz glass, a rectilinear dielectric optical waveguide provided on the flat dielectric substrate, made of a dielectric material having a high refractive index and extending in said first direction, input and output optical waveguides provided on the dielectric substrate and being coupled with both ends of the dielectric optical waveguide, and a pair of electron beam converging electrodes arranged on respective sides of the dielectric optical waveguide. A velocity of the incident light is delayed during propagation through the dielectric optical waveguide, and a part of the incident light penetrates from the dielectric optical waveguide into the vacuum in the form of evanescent light. The electron beam is confined in a narrow region above the dielectric optical waveguide by means of an electric field produced by said electrodes, and the thus confined electron beam effectively interacts with an optical component of the evanescent light directed in the electron beam travelling direction to amplify the incident light.

11 Claims, 3 Drawing Sheets

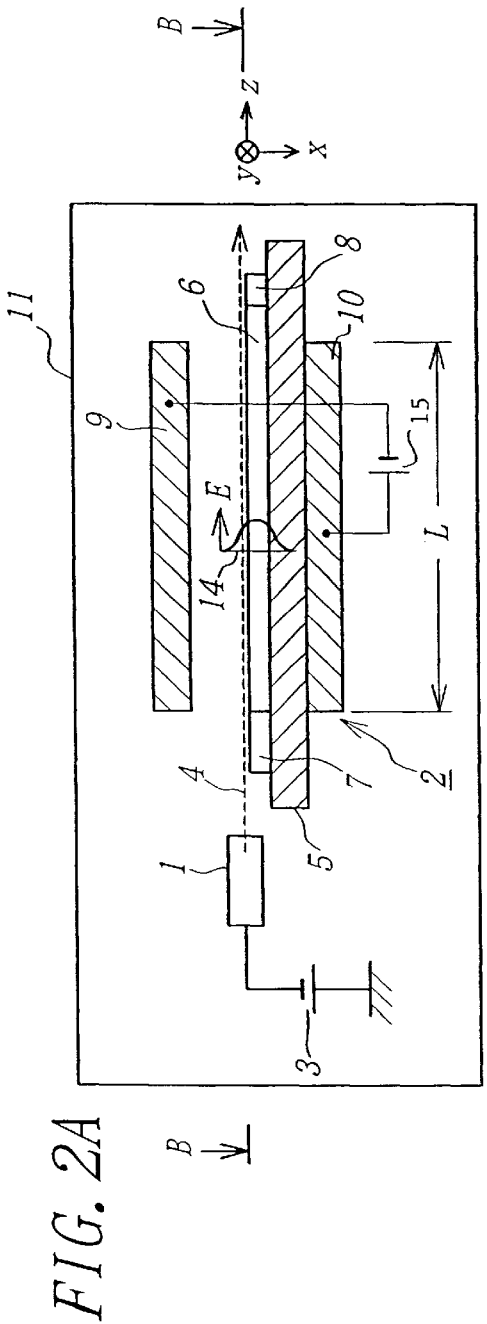
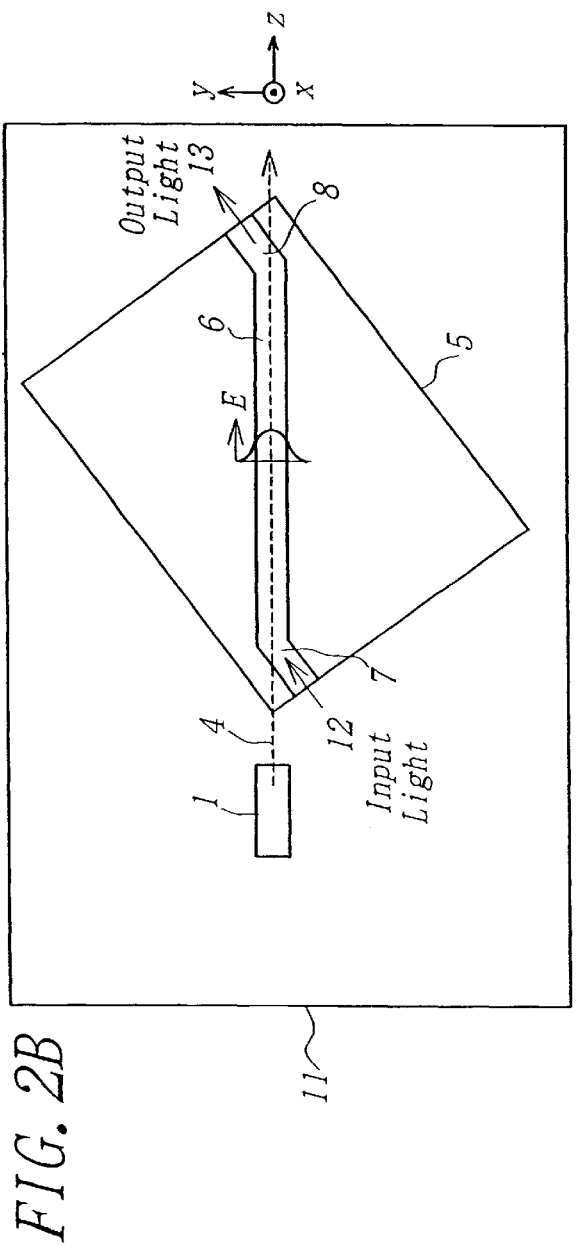
FIG. 2A
FIG. 2B

UNIDIRECTIONAL OPTICAL AMPLIFIER

FIELD OF THE INVENTION

The present invention relates to a unidirectional optical amplifier for amplifying light propagating in one direction, said unidirectional optical amplifier being applicable to various fields, such as electrical engineering, electronic engineering, quantum electronics, opto-electronics and laser engineering.

BACKGROUND OF THE INVENTION

There have been proposed various lasers for performing a unidirectional amplification of light. Recently, gas, solid state, liquid and semiconductor lasers have been practically used. These lasers are typical opto-electronic elements or devices which can perform the light generation and light amplification. In these elements or devices, energy of electrons bound by atoms and molecules in laser materials is used, and thus both forward and backward waves are amplified, and the optical amplification can not be performed in a unidirectional manner. Therefore, when light emitted by a laser is reflected by surfaces of lenses, optical fibers and optical disks and is made incident upon the laser, the thus returned light, i.e. back light, is also amplified. This makes laser emission quality and laser amplification quality unstable and generates excessive noise.

Up to now, in order to solve the above problem, it has been generally proposed to provide an optical isolator between a laser light source and an optical system such that light reflected by the optical system is not made incident upon the laser light source. However, since the optical isolator has a bulk mainly made of a magnetic material and is very expensive, the application of the optical isolator is limited. In practice, the optical isolator has been used in a basic study of optical fields and in large capacity optical fiber communication systems. However, the optical isolator could not be used in the field of optical disk devices which are small in size and less expensive in cost. Therefore, in the optical disk devices, the degradation of laser quality and the generation of noise due to the back light have been a technical obstacle to the application of lasers.

There has been further proposed an optical integrated circuit, in which a laser generating part, a light amplification part and a light modulating part are integrated as a single integrated unit, and information is processed at a high speed by light. However, such an optical integrated circuit has another problem in that the various parts can not be effectively coupled with each other due to the back light from a succeeding part.

A free electron laser has been developed as a device for generating light within a wide wavelength range. The free electron laser operates on a principle which is entirely different from other lasers. In the free electron laser, energy of an electron beam travelling in one direction within vacuum is given to light, and thus only a light component travelling in the same direction as the electron beam can be amplified. However, since the free electron laser has been developed mainly for generating light, it is not designed to utilize the above mentioned unidirectional amplification characteristic. Moreover, in the free electron laser, since the electron beam has to be accelerated near the optical velocity, an exciting voltage for the electron beam is very high, such as not less than 10 MV, and an extremely high magnetic field is required to vibrate periodically the electron beam. In this manner, the free electron laser has been developed for special high energy applications, and it can not be preferably applied to the electronic field of signal amplification.

A travelling wave tube is a unidirectional electron tube which has an operation frequency higher than the upper limit (about 1 GHz) of the operation frequency of normal electron tubes and transistors operating as a functional electron element having the unidirectionality. In this travelling wave tube, a travelling velocity of an electromagnetic wave is decreased by means of a transmission delay line made of a metal, and energy of an electron beam emitted from an electronic gun is given to this electromagnetic wave. Energy loss due to electron scattering by collision to surrounding materials is suppressed by evacuating a space surrounding the electrons.

In this travelling wave tube, the electromagnetic wave is amplified when the velocity of the electron beam coincides with the travelling velocity of the electromagnetic wave, and therefore the electromagnetic wave travelling in an opposite direction is not amplified. Since a wavelength of the electromagnetic wave is decreased in accordance with an increase in its frequency, an upper limit of the frequency of the travelling wave is limited by a metal processing technique. Therefore, a frequency higher than several tens of GHz (wavelength is less than several cm) could not be realized. Consequently, it is impossible at present to manufacture a travelling wave tube which can be applied to light having a wavelength not larger than 1 $\mu$m due to the practical limit of the presently developed metal processing engineering.

To solve the above problems, the inventor of the present application has suggested a unidirectional optical amplifier using an electron beam in a solid state body in a co-pending U. S. patent application Ser. No. 09/046,508 now U.S. Pat. No. 6,219,175. The inventor has theoretically proved that unidirectional optical amplification is possible by combining an electron beam travelling line for an electron beam emitted into the solid state body with a delay waveguide made of a dielectric material for delaying light to be amplified.

In the above mentioned unidirectional optical amplifier, when the electron beam travelling line is made of ZnSe, a sufficiently high accelerating voltage could not be used, because when the accelerating voltage exceeds 2.5 V, electrons could not travel along the travelling line. Then, a spatial phase variation of the electromagnetic field becomes very fine, and the delay waveguide has to be formed precisely with a precision of less than nano-meter order. At present such a precise processing can not be easily realized.

The inventor has also proposed an electron tube type unidirectional optical amplifier in co-pending U.S. patent application Ser. No. 09/178,735, now U.S. Pat. No. 6,195,199 in which an electron beam emitted in the vacuum is utilized to amplify the light beam. In this electron tube type unidirectional optical amplifier, an optical amplifying section is constructed by a pair of wave-like mirrors arranged within the vacuum to constitute a delay waveguide for light, and incident light is amplified in a unidirectional manner with the help of energy from an electron beam emitted from an electron emitting section.

In this electron tube type unidirectional optical amplifier, the wave-like mirrors have to be manufactured with a precision not larger than nano-micron order, at present such a technique has not been developed.

SUMMARY OF THE INVENTION

The present invention has as its object to provide a novel and useful unidirectional optical amplifier, in which the above mentioned problems can be solved by realizing a unidirectional light amplification based on the transfer of the kinetic energy of an electron beam to evanescent light penetrated into the vacuum from an optical beam propagating along a dielectric waveguide, both of said electron beam and optical beam travelling in the same direction within the vacuum.

According to the invention, a unidirectional optical amplifier comprises:

a vacuum vessel;

an electron emission part arranged within said vacuum vessel and emitting an electron beam in a first direction; and an optical amplification part provided within said vacuum vessel and amplifying incident light in a unidirectional manner by means of energy obtained from the electron beam emitted from said electron emission part;

wherein said optical amplification part comprising:

a dielectric substrate;

a rectilinear dielectric optical waveguide formed on said dielectric substrate to extend in said first direction along which the electron beam travels, said dielectric optical waveguide being made of a dielectric material;

an input optical waveguide formed on said dielectric substrate and having one end upon which the incident light is made incident and the other end coupled with one end of said dielectric optical waveguide;

an output optical waveguide formed on said dielectric substrate and having one end from which the amplified light emanates and the other end coupled with the other end of the dielectric optical waveguide; and a pair of electrodes arranged on both sides of said dielectric optical waveguide for converging the electron beam such that the electron beam travels in a vacuum along a surface of said dielectric optical waveguide and incident light which penetrates from the dielectric optical waveguide into the electron beam travelling path in the form of evanescent light having an electric field component directed in said first direction along which the electron beam travels to amplify the incident light.

In the unidirectional optical amplifier according to the invention, the incident light propagates through the rectilinear flat dielectric optical waveguide, and a velocity of the incident light propagating through the dielectric optical waveguide is reduced. Furthermore, during the propagation, a part of the incident light penetrates from the waveguide into the vacuum in the form of the evanescent light. Since the dielectric optical waveguide operates with the TM mode, the evanescent light has the electric field component in the travelling direction of the electron beam. The electron beam is confined in a narrow region above the dielectric optical waveguide and interacts with said optical component of the evanescent light. It should be noted that since the electron beam can interact exclusively with the optical component directed in the travelling direction of the incident light, back light can not be amplified. In this manner, the incident light is effectively amplified by energy of the electron beam in the unidirectional manner. The thus amplified light emanates from the output optical waveguide.

In the unidirectional optical amplifier according to the invention, when the incident light is visible light, said dielectric optical waveguide may be made of a dielectric material selected from the group consisting of II-VI compound semiconductor materials such as ZnSe, CdS and a mixed crystal of ZnSe and CdS, and III-V compound semiconductor materials such as GaN.

When the incident light is in a range from the microwave region to near infrared region, said dielectric optical waveguide is made of a dielectric material selected from the group consisting of IV semiconductor materials such as Si and Ge, II-VI compound semiconductor materials such as ZnSe, CdS and a mixed crystal of ZnSe and CdS, and III-V compound semiconductor materials such as GaAs, InP, GaP and mixed crystals of GaAs, InP and GaP.

In a preferable embodiment of the unidirectional optical amplifier according to the invention, said dielectric substrate is made of a dielectric material such as quartz glass and inorganic substances having a high transparency for use with an electromagnetic wave from the microwave region to the visible light region.

Furthermore, in the unidirectional optical amplifier according to the invention, said pair of electrodes may be preferably made of a metal material selected from the group consisting of Ni, Ag, Al and alloys thereof.

In the unidirectional optical amplifier according to the present invention, the dielectric optical waveguide is formed rectilinearly and the electron beam travels along the dielectric optical waveguide. Therefore, the input and output optical waveguides have to be arranged such that they do not interfere with the electron beam.

In an embodiment of the unidirectional optical amplifier according to the invention, the input and output optical waveguides are coupled with the dielectric optical waveguide at its ends, perpendicularly thereto, by means of respective corner portions.

In another embodiment of the unidirectional optical amplifier according to the invention, the input and output optical waveguides are coupled with the dielectric optical waveguide at its ends with given angles in an inclined fashion. In this case, it is preferable that the dielectric optical waveguide extend along a diagonal of the rectangular dielectric substrate.

In still another embodiment of the unidirectional optical amplifier according to the invention, the dielectric substrate includes a flat portion on which the rectilinear dielectric optical waveguide is provided, and first and second bent portions coupled with respective ends of the flat portion and on which the input and output optical waveguides are provided, respectively.

BRIEF DESCRIPTION OF THE DRAWINGS

FIGS. 2A and 2B are schematic views illustrating a principal structure of a second embodiment of the unidirectional optical amplifier according to the invention.

DESCRIPTION OF THE PREFERRED EMBODIMENTS

The present invention will be explained in detail with reference to embodiments shown in the accompanied drawings.

Figure 1A:
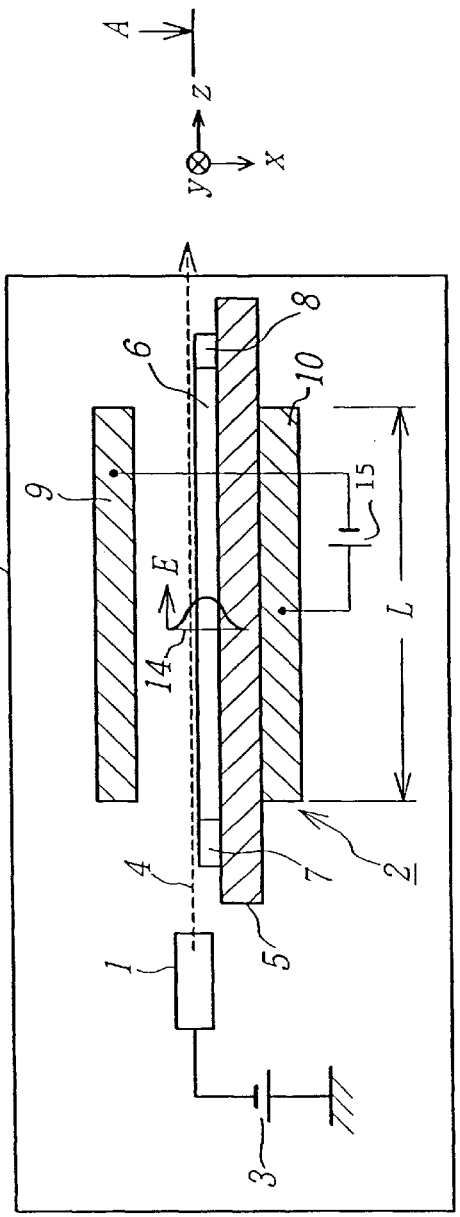
FIGS. 1A and 1B are schematic views showing a principal structure of a first embodiment of the unidirectional optical amplifier according the invention.
Figure 1B:
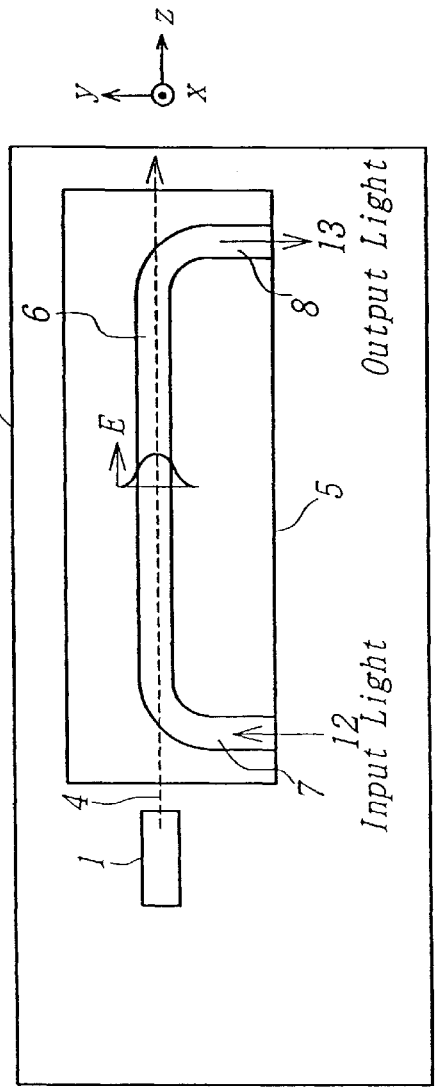

FIG. 1A is a schematic cross sectional view showing a principal structure of a first embodiment of the unidirectional optical amplifier according to the invention, and FIG. 1B is a schematic cross sectional view cut along a line A—A in FIG. 1A. As shown in FIG. 1A, the unidirectional optical amplifier comprises an electron emitting part 1 and an optical amplifying part 2. The electron emitting part 1 and optical amplifying part 2 are arranged within a vacuum vessel 11. Since the electron emitting part 1 and optical amplifying part 2 are arranged within the vacuum vessel 11, energy loss of the electron beam emitted from the electron emitting part 1 due to scattering caused by impinging upon substances surrounding an electron beam travelling path can be suppressed. The electron emitting part 1 may be constituted by an electron gun to which an accelerating voltage having a suitable value is applied from a voltage source 3 to emit an electron beam 4.

The optical amplification part 2 comprises a dielectric substrate 5, a dielectric optical waveguide 6 formed on the dielectric substrate 5 such that the dielectric waveguide includes a rectilinear portion which extends in a direction (z axis direction) in which the electron beam 4 travels as best shown in FIG. 1B. The dielectric optical waveguide 6 further includes an input optical waveguide 7 and an output optical waveguide 8. Incident light 12 to be amplified is made incident upon the input optical waveguide 7, and amplified output light 13 emanates from the output optical waveguide 8. Strictly speaking, the dielectric substrate, the dielectric core and the vacuum constitute a dielectric optical waveguide of three-layer structure. However, for the sake of explanation, in the present specification, the dielectric core is called the dielectric optical waveguide 6.

The optical amplifying part 2 further comprises a pair of electrodes 9 and 10 which are arranged on respective sides of the dielectric optical waveguide 6. The electrodes 9 and 10 are connected to an electron beam converging voltage source 15 such that the upper electrode 9 is connected to a negative terminal of the voltage source and the lower electrode 10 is connected to a positive terminal of the voltage source 15, and thus the electron beam 4 travelling along the electron beam path along the surface of the dielectric optical waveguide 6 is converged toward the surface of the dielectric optical waveguideb 6. It should be noted that the electron gun 1 has an electron lens for converging the electron beam. However, this converging lens can converge the electron beam only to several microns. According to the invention, it is preferable to converge the electron beam such that the electron beam is confined within a thickness of not larger than several hundred nano meters. In the microwave travelling tube and Cherenkov maser, use is made of a magnetic converging system, but the magnetic converging system is liable to be large in size and complicated in structure. Therefore, according to the invention, the electrostatic type converging system including the electrodes 9 and 10 is provided.

The dielectric optical waveguide 6 is preferably made of a dielectric material having a refractive index which is as high as possible for a wavelength of the incident light, and which is transparent for the relevant light. When the incident light is visible light, the dielectric optical waveguide 6 may be made of a III-VI compound semiconductor material such as ZnSe, CdS and mixed crystals thereof, or III-V compound semiconductor material like GaN. When the incident light is from the microwave region to near infrared region, the dielectric optical waveguide 6 may be made of a IV compound semiconductor material such as Ge and Si, a II-VI compound semiconductor material, such as ZnSe, CdS and mixed crystals thereof, or a II-V compound semiconductor material, such as GaAs, InP, GaN and mixed crystals thereof.

The dielectric substrate 5 may be made of a material whose refractive index is as low as possible for a wavelength of the incident light and which is transparent for the incident light. For a wavelength range from microwave to visible light, the dielectric substrate 5 may be preferably made of quartz glass and inorganic substances.

The electron beam converging electrodes 9 and 10 may be made of a metal, such as Ni, Ag and Al and various kinds of alloys.

In the present embodiment, the dielectric substrate 5 is made of quartz glass, the dielectric optical waveguide 6 is made of GaAs, and the electrodes 9 and 10 are made of Al.

Now the principle of the optical amplification will be explained.

It is assumed that an angular frequency and the wavenumber of the incident light 12 are denoted by $\omega$ and $\beta$, respectively, the energy and the wavenumber of the electrons emitted from the electron gun 1 are represented by $W_b$ and $k_b$, respectively, the energy and the wavenumber of the electrons whose energy has been given to the incident light 12 are represented by $W_a$ and $k_a$, and Planck's constant is expressed by $\hbar$. Then, the incident light 12 can be amplified when the following equations (1) and (2) are satisfied.

$$W_b - W_a = \hbar\omega \tag{1}$$

$$k_b - k_a = \beta \tag{2}$$

The equation (2) is not satisfied in free space because the wavenumber $\beta$ of light is too small in free space as the velocity of the light is $\omega/\beta$. Therefore, in the present embodiment, a velocity of the incident light 12 is decreased and the wavenumber $\beta$ is increased by propagating the incident light 12 along the dielectric optical waveguide 6 formed on the dielectric substrate 5.

The dielectric optical waveguide 6 is made of a dielectric material having an effective refractive index $n_{eff}$, and then light propagates at a velocity $c/n_{eff}$. Therefore, the optical amplification is performed when the following condition is satisfied.

$$\omega/\beta = c/n_{eff} \tag{3}$$

In order to realize this condition, the wavenumber of light $\beta = n_{eff}\omega/c$ has to be increased to decrease a propagating velocity $c/n_{eff}$ of light in the electron beam travelling direction (z axis direction), and at the same time the light should have an electric field component in the electron beam travelling direction (z axis direction). In the present embodiment, the propagating velocity $c/n_{eff}$ of light is decreased by constructing the dielectric optical waveguide 6 with a dielectric material having a high refractive index. It should be noted that if the light does not have an electric field component in the z axis direction, no optical amplification is realized. For light travelling in the opposite direction, the wavenumber becomes $-\beta$ and the above condition (2) is not satisfied, and therefore such light is not amplified.

The effect of the light amplification in the optical amplifying part 2 has been theoretically analyzed by utilizing the density matrix method, which is one of the analysis methods of quantum mechanics, and a gain coefficient g of light is shown by the following equation.

$$g = \frac{\mu_0 e \lambda J L}{n_{eff} \hbar} \xi D \tag{4}$$

Herein $\mu_0$ is a permeability in vacuum, e is charge of an electron, $\lambda$ is a wavelength of light, J is a current density of an electron beam, L is an effective length of the optical amplifying part 2, $\hbar$ is the Planck's constant, D is a coefficient representing a difference between the optical amplification and the light absorption, and $\xi$ is a coupling ratio of light with an electron beam, which is determined by a ratio of the electric field component of the evanescent light penerating into the vacuum and the convergence of the electron beam.

Then, the amplification factor A of the light amplifying part 2 may be represented by the following equation (5).

$$A = \exp(gL) \quad (5)$$

Then, an accelerating voltage $V_e$ required for the light amplification is expressed by the following equation (6), where m is a mass of an electron.

$$V_e = \frac{m}{2e}\left(\frac{\varpi}{\beta}\right)^2 \quad (6)$$

Now the operation of the unidirectional optical amplifier of this embodiment will be explained.

The incident light 12 is made incident upon the input optical waveguide 7, which is perpendicular to the travelling direction of the electron beam 4, and is bent by 90 degrees at a corner portion. Then, the incident light 12 travels along the dielectric optical waveguide 6. The propagating velocity of the incident light 12 in the electron beam travelling direction (z axis direction) is delayed by the dielectric optical waveguide 6 in accordance with the effective refractive index $n_{eff}$ of the dielectric material such that the light can receive energy from the electron beam 4. The higher the effective refractive index of the dielectric material is, the lower the propagating velocity of the light becomes. Within the dielectric optical waveguide 6, the light is guided to be concentrated toward a center of the waveguide, but is not completely confined within the waveguide and a part of the light propagating along the dielectric optical waveguide 6 penetrates into the vacuum in the form of evanescent light. Since the incident light 12 is polarized in a direction of a thickness of the dielectric optical waveguide 6, i.e., the x axis direction, the optical waveguide operates as the TM (transverse magnetic) mode, and the penetrating evanescent light has an electric field component in the travelling direction as shown by 14 in FIGS. 1A and 1B, and this optical component interacts with the electron beam 4 to receive energy from the electron beam 4. In this manner, the light is amplified by the energy of the electron beam 4 within the optical amplifying part 2. The thus amplified output light 13 emanates from the output optical waveguide 8 after being bent by 90 degrees at a corner portion.

As explained above, in the present embodiment, the optical amplification is dependent upon the dielectric material of the dielectric optical waveguide 6, and therefore in order to attain a larger amplification, it is necessary to select a dielectric material having a high effective refractive index and transparency for a wavelength of the incident light 12.

In a numerical example, if the wavelength $\lambda$ of the incident light 12 is 1.5 $\mu$m, the accelerating voltage $V_e$ is 32 KV and the current density J is 10A/cm$^2$, then an amplification factor A more than 3000 can be attained if the length L of the interacting portion of the optical amplifying part 2 is set to 2 cm.

FIGS. 2A and 2B are schematic views depicting a second embodiment of the unidirectional optical amplifier according to this invention.

FIG. 2B is a schematic cross sectional view cut along a line B—B in FIG. 2A.

The present embodiment differs from the first embodiment in the shape of the dielectric optical waveguide 6 and the input and output optical waveguides 7 and 8. That is to say, the input and output optical waveguides 7 and 8are coupled to both ends of the rectilinear dielectric optical waveguide 6 with a given angle in an inclined fashion. The remaining structure of the present embodiment is similar to that of the first embodiment. Therefore, similar portions are denoted by the same reference numerals used in FIGS. 1A and 1B.

Figure 3A:
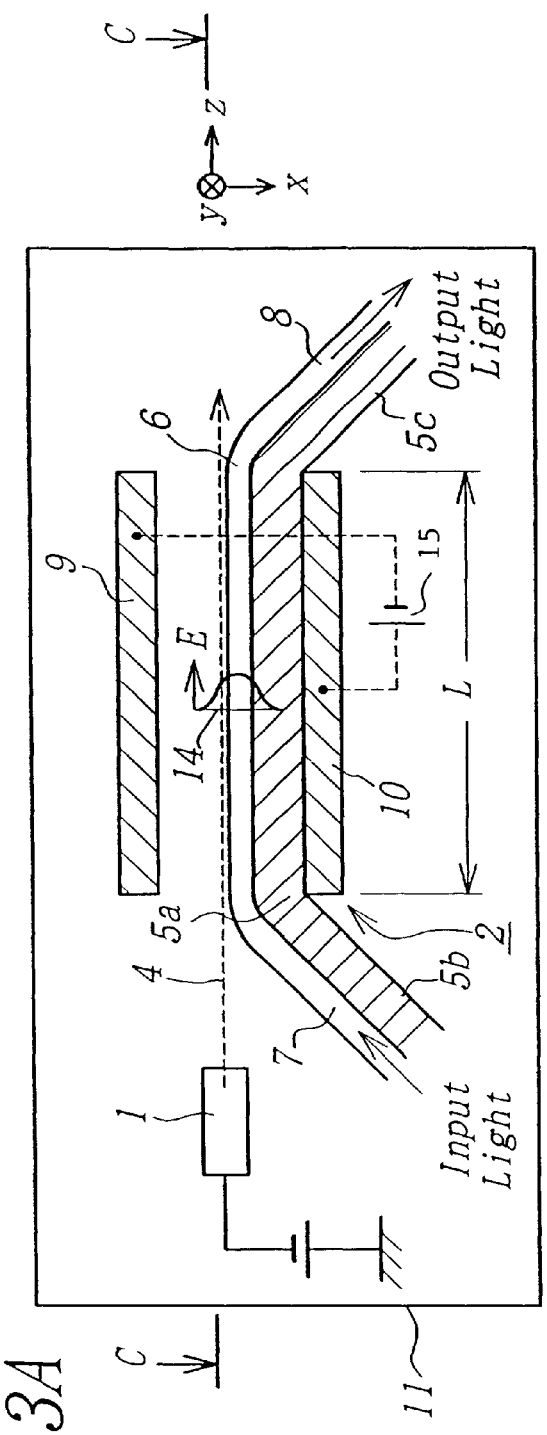
FIGS. 3A and 3B are schematic views depicting a principal structure of a third embodiment of the unidirectional optical amplifier according to the invention.
Figure 3B:
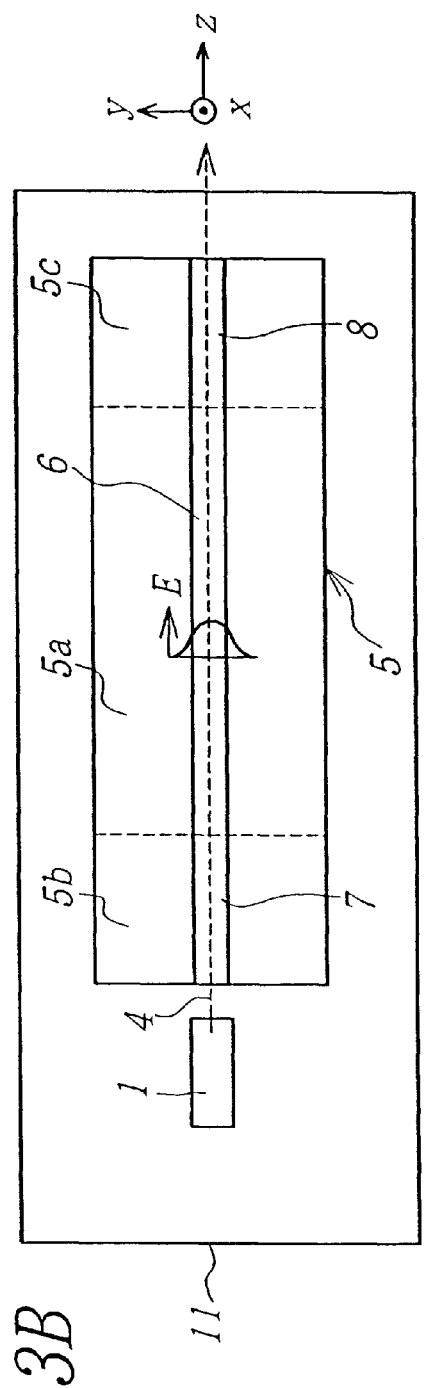

FIGS. 3A and 3B are schematic views depicting a third embodiment of the unidirectional optical amplifier according to this invention. FIG. 3B is a schematic cross sectional view cut along a line C—C in FIG. 3A.

In the present embodiment, the dielectric substrate 5 is not flat, but includes a flat portion 5a and bent portions 5a and 5b at both ends of the flat portion 5a. The rectilinear dielectric optical waveguide 6 is provided on the flat portion 5a, and the input and output optical waveguides 7 and 8 are formed on the bent portions 5a and 5b, respectively. The input and output optical waveguides 7 and 8 are coupled with the dielectric optical waveguide 6 provided on a flat portion 5c at boundaries between the flat portion 5a and the bent portions 5b and 5c, respectively. The remaining structure of the present embodiment is similar to that of the first embodiment. Therefore, similar portions are denoted by the same reference numerals used in FIGS. 1A and 1B.

The third embodiment of the unidirectional optical amplifier shown in FIGS. 3A and 3B operates in the same manner as the first and second embodiments.

Now the unidirectional optical amplifier according to the invention will be compared with the known techniques and the prior applications of this inventor (co-pending U.S. patent applications Ser. Nos. 09/046,508 now U.S. Pat. No. 6,219,175 and now U.S. Pat. No. 09/178,735 6,195,199).

Firstly, the unidirectional optical amplifier according to the invention is essentially different from the known laser in which the light propagating in mutually opposite directions is amplified.

Secondly, the optical amplification in the unidirectional optical amplifier according to the invention has been predicted on the basis of a novel theoretical analysis by the inventor of the present application to be like the optical amplifier described in the co-pending patent applications.

Thirdly the unidirectional optical amplifier according to the present invention can operate over a wide wavelength range from microwave to visible light.

Fourthly, the present invention is common with the optical amplifiers of the co-pending former patent application in the point that the optical amplification is performed by an electron beam. However, in the former co-pending patent application, use is made of electrons within a solid state substance, whereas in the present invention, electrons in a vacuum are utilized. Moreover, in the present invention, the light is delayed with the aid of the rectilinear dielectric optical waveguide made of a dielectric material having a high refractive index as well as a high transparency. In the former co-pending application, the use is made of a complicated dielectric optical waveguide constituting a zigzag light travelling path.

Fifthly, the unidirectional optical amplifier according to the invention resembles the electron tube type optical amplifier disclosed in the latter co-pending application in that the optical amplification is performed by an electron beam travelling within a vacuum. However, in the latter co-pending application, the propagating velocity of light is delayed with the aid of wave-like mirrors. It is apparent that such wave-like mirrors can not be manufactured easily as compared with the rectilinear dielectric optical waveguide according to the invention.

Sixthly, the unidirectional optical amplifier resembles the travelling wave tube for a microwave range in that the electromagnetic waves are amplified by using the electron beam emitted from the electron gun in the vacuum as well as in that the delaying waveguide for the electromagnetic wave is used. However, in the conventional travelling wave tube, the electromagnetic wave is delayed by means of a helical (coil-like) line, whereas in the unidirectional optical amplifier according to the invention, the light (the electromagnetic wave) is delayed by means of the dielectric optical waveguide. The conventional travelling wave tube can be used in a microwave range, but can not be used in the light region.

As explained above in detail, the present invention provides a novel unidirectional optical amplifier. The appearance of such an electron tube type unidirectional optical amplifier is equivalent to the invention of the electron tube and transistor in the light frequency range, and can promote further development in opto-electronic engineering which has been developed mainly for signal processing, such as optical communication techniques, optical measurement techniques and optical recording techniques. In addition to such opto-electronic engineering, electrical engineering, electronic engineering and information engineering could be developed to an extremely high degree. Moreover, the electron tube type unidirectional optical amplifier according to the present invention can be utilized in applications using high energy light such as material processing and nuclear fusion.

The unidirectional optical amplifier according to the invention can be most advantageously used for composing an optical circuit using light signal communication. That is to say, various optical elements and devices, such as optical oscillators, optical amplifiers, optical modulators, optical switches and optical memory may be composed into an optical circuit. For instance, when the unidirectional optical amplifier according to the invention is used as a light source in an optical fiber communication system or in various optical measurement equipments, the problem of the back light can be solved without using optical isolators.

In the laser processing machine and laser surgeon's knife and so on, when a laser light source is formed by the unidirectional optical amplifier according to the invention, a system can operate stably without being affected by the back light reflected from an object to be processed.

Moreover, the unidirectional optical amplifier according to the invention can be applied to THz (terra hertz) region and far infrared region. Such an electromagnetic wave region could never be utilized in the prior art. According to the invention, novel devices for emitting and amplifying an electromagnetic wave from THz region to far infrared region may be realized.

What is claimed is:

1. A unidirectional optical amplifier comprising:
   a vacuum vessel;
   an electron emission part arranged within said vacuum vessel and emitting an electron beam in a first direction; and
   an optical amplification part provided within said vacuum vessel and amplifying incident light in a unidirectional manner by means of energy obtained from the electron beam emitted from said electron emission part, said optical amplification part comprising:
   a dielectric substrate;
   a rectilinear dielectric optical waveguide formed on said dielectric substrate to extend in said first direction along which the electron beam travels, said dielectric optical waveguide being made of a dielectric material;
   an input optical waveguide formed on said dielectric substrate and having one end upon which the incident light is made incident and the other end coupled with one end of said dielectric optical waveguide;
   an output optical waveguide formed on said dielectric substrate and having one end from which the amplified light emanates and the other end coupled with the other end of the dielectric optical waveguide; and
   a pair of electrodes arranged on both sides of said dielectric optical waveguide for converging the electron beam such that the electron beam travels in a vacuum along a surface of said dielectric optical waveguide and interacts with a part of the incident light which penetrates from the dielectric optical waveguide into the electron beam travelling path in the form of evanescent light having an electric field component directed in said first direction along which the electron beam travels to amplify the incident light.

2. A unidirectional optical amplifier as claimed in claim 1, wherein said incident light is visible light, and said dielectric optical waveguide is made of a dielectric material selected from the group consisting of II-VI compound semiconductor materials and III-V compound semiconductor materials.

3. A unidirectional optical amplifier as claimed in claim 2, wherein said dielectric optical waveguide is made of a dielectric material selected from the group consisting of ZnSe, CdS, a mixed crystal of ZnSe and CdS, and GaN.

4. A unidirectional optical amplifier as claimed in claim 1, wherein said incident light is in a range from microwave to near infrared region, and said dielectric optical waveguide is made of a dielectric material selected from the group consisting of IV semiconductor materials, II-VI compound semiconductor materials and III-V compound semiconductor materials.

5. A unidirectional optical amplifier as claimed claim 4, wherein said dielectric optical waveguide is made of a dielectric material selected from the group consisting of Si, Ge, ZnSe, CdS, a mixed crystal of ZnSe and CdS, GaAs, InP, GaP, and mixed crystals of GaAs, InP and GaP.

6. A unidirectional optical amplifier as claimed in claim 1, wherein said dielectric substrate is made of a dielectric material having a transparency for an electromagnetic wave from microwave region to visible light region.

7. A unidirectional optical amplifier as claimed in claim 6, wherein said dielectric substrate is made of a material selected from the group consisting of quartz glass and inorganic substances.

8. A unidirectional optical amplifier as claimed in claim 1, wherein said pair of electrodes are made of a metal material selected from the group consisting of Ni, Ag, Al and alloys.

9. A unidirectional optical amplifier according to claim 1, wherein said input and output optical waveguides are coupled with the dielectric optical waveguide at its ends perpendicularly thereto by means of corner portions, respectively.

10. A unidirectional optical amplifier according to claim 1, wherein said input and output optical waveguides are coupled with the dielectric optical waveguide at its ends with given angles in an inclined fashion.

11. A unidirectional optical amplifier according to claim 1, wherein said dielectric substrate includes a flat portion on which the rectilinear dielectric optical waveguide is provided, and first and second bent portions coupled with respective ends of the flat portion and on which the input and output optical waveguides are provided, respectively.

* * * * *